United States Patent
Estacio

(10) Patent No.: US 7,347,176 B1
(45) Date of Patent: Mar. 25, 2008

(54) GASKET WITH LEAK CONDUIT

(75) Inventor: Edgardo Y. Estacio, Itasca, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/557,542

(22) Filed: Nov. 8, 2006

(51) Int. Cl.
*F02F 11/00* (2006.01)

(52) U.S. Cl. .............. 123/196 R; 123/195 R; 277/591

(58) Field of Classification Search ............ 123/196 R, 123/195 R; 277/591, 594, 597
See application file for complete search history.

(56) References Cited

U.S. PATENT DOCUMENTS

| | | | |
|---|---|---|---|
| 6,325,388 B1 * | 12/2001 | Shattuck | 277/591 |
| 6,406,032 B1 * | 6/2002 | Miyaoh | 277/594 |
| 6,588,766 B2 * | 7/2003 | Shattuck | 277/591 |
| 7,097,178 B2 * | 8/2006 | Shattuck | 277/594 |
| 2002/0130471 A1 * | 9/2002 | Shattuck | 277/591 |
| 2004/0046333 A1 * | 3/2004 | Shattuck | 277/591 |
| 2005/0046121 A1 * | 3/2005 | Jones et al. | 277/594 |
| 2005/0132998 A1 * | 6/2005 | Gorgas et al. | 123/196 A |

* cited by examiner

*Primary Examiner*—Stephen K. Cronin
*Assistant Examiner*—Jason Benton
(74) *Attorney, Agent, or Firm*—Jeffrey P. Calfa; Gerald W. Askew

(57) ABSTRACT

A gasket (200) includes a metal substrate (202) that has a first opening (204) and a second opening (216) formed therein. A first sealing bead (208) substantially surrounds the first opening (204). A second sealing bead (220) substantially surrounds the second opening (216). A leak conduit (230) is formed in the metal substrate (202) in an area (228) between the first sealing bead (208) and the second sealing bead (220), such that a leak-flow (316) of a first fluid from the second opening (216) past the second sealing bead (220) is routed away from the first sealing bead (208).

20 Claims, 3 Drawing Sheets

GASKET WITH LEAK CONDUIT

FIELD OF THE INVENTION

This invention relates to internal combustion engines, including but not limited to sealing apparatus for use on internal combustion engines having passages for different fluids that are adjacent to each other.

BACKGROUND OF THE INVENTION

Internal combustion engines use a variety of fluids that perform various functions during operation. Such fluids include, for example, lubrication oil, water or coolant, fuel, and so forth. When engines are assembled, there are often fluid passages carrying different fluids adjacent to each other. These fluid passages often pass from one engine component to another through component interfaces. These component interfaces are usually sealed to prevent leakage and mixing of the various fluids that are passing therethrough.

Often, a performance of seals on the engine may degrade over time and allow small or large leaks to develop in the fluid passages. Leaking fluids on engines, that otherwise may be relatively harmless, become problematic if they cause two or more fluids to intermix. Such leaks, often referred to as internal leaks, are not be easily detectible and cause a loss of performance to the engine. One example of such a leak may be a leakage of engine coolant into the engine's lubrication oil supply.

Past attempts to deal with the issue of internal mixing of fluids on an engine have primarily included routing passages carrying the fluids that are sought to be kept apart far from each other. Routing of such passages away from each other partly rectifies the issue of fluid mixing, but this solution may only be used when feasible. Some times there are engine configurations that require passages carrying different fluids to be routed close to each other for lack of alternative routing paths or space available.

Accordingly, there is a need for a sealing configuration that will ensure proper fluid segregation on an internal combustion engine, especially in cases where loss of sealing performance of seals is plausible, when passages carrying different fluids are routed in close proximity to each other.

SUMMARY OF THE INVENTION

A gasket includes a metal substrate that has a first opening and a second opening formed therein. A first sealing bead substantially surrounds the first opening. A second sealing bead substantially surrounds the second opening. A leak conduit is formed in the metal substrate in an area between the first sealing bead and the second sealing bead, such that a leak-flow of a fluid from the second opening past the second sealing bead is routed away from the first sealing bead.

DESCRIPTION OF A PREFERRED EMBODIMENT

The following describes an apparatus for avoiding intermixing between fluids passing through adjacent fluid passages that are formed in an internal combustion engine, the passages being sealed by a single sealing apparatus or gasket.

Figure 1:
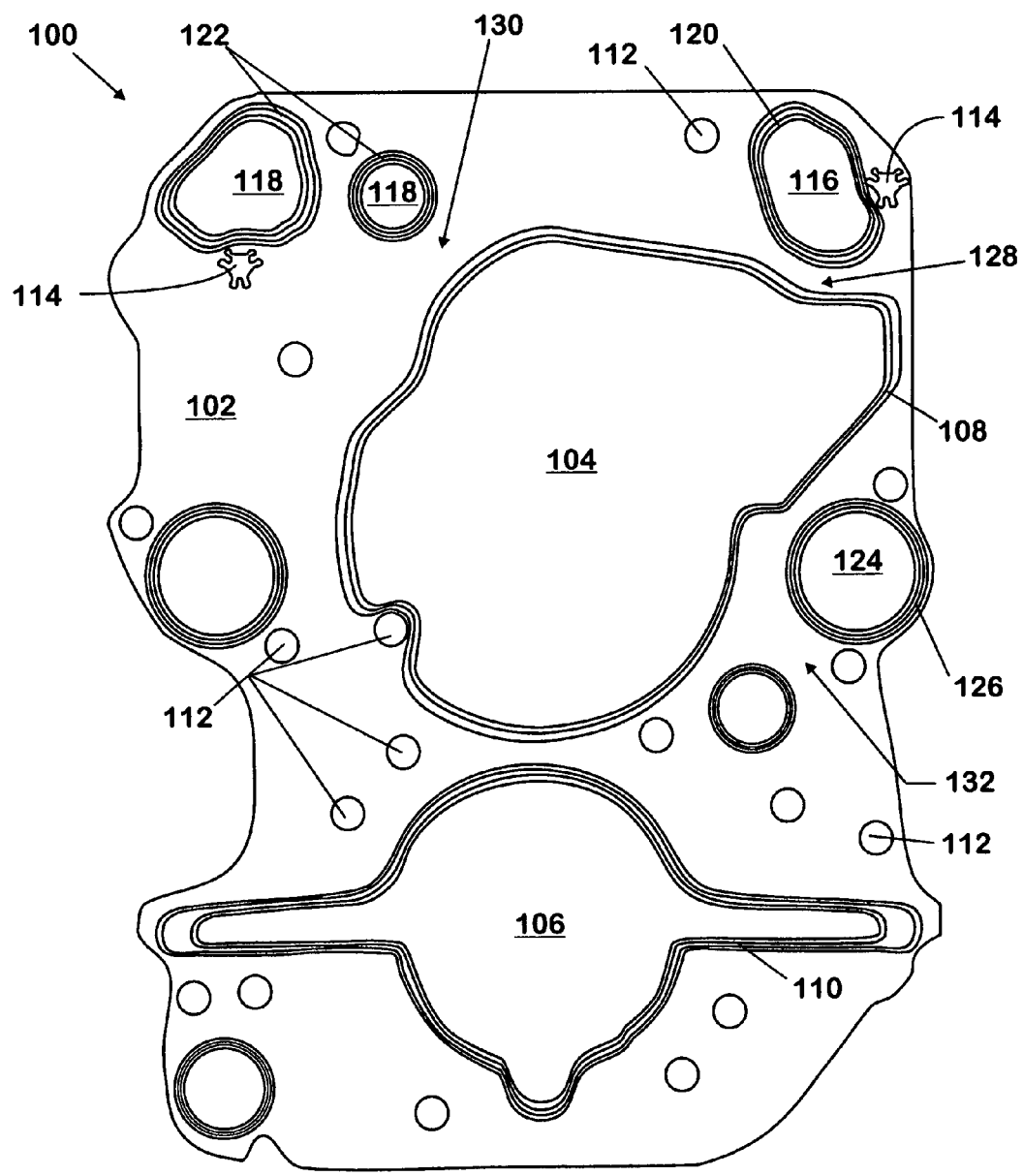
FIG. 1 is a front view of a known gasket having sealable fluid openings.

A gasket 100 that is arranged and constructed to seal multiple fluid passages in an internal combustion engine is shown in FIG. 1. The gasket 100 includes a metal substrate 102 having openings formed therein. A first opening 104 and a third opening 106 are comparatively larger than others and are part of a first fluid system, for example, a low pressure oil system. Each of the first opening 104, and third opening 106, are substantially surrounded by a first sealing bead 108, and a third sealing bead 110, respectively. The first sealing bead 108 and the third sealing bead 110 may be made of an elastomeric material, for example Poly-tetra-fluor-ethylene (PTFE), ethylene-propylene-diene-rubber (EPDM), or another suitable material, that has been deposited or coated onto the metal substrate 102 by an over-molding operation, as is known. The sealing beads 108 and 110 are compressed between two adjacent engine components (not shown) when the gasket 100 is installed onto an engine (also not shown), and sealably engage various surfaces formed on the engine components. The sealable engagement of the sealing beads 108 and 110 acts to seal low pressure oil present in each of the first passage 104 and the second passage 106 from leaking out.

The gasket 100 also includes a plurality of fastener openings 112 that are formed in the metal substrate 102 and are arranged to allow for passage of fasteners (not shown) therethrough that are used to connect the engine components to each other. The fastener openings 112 typically do not carry any fluids and do not require sealing. The gasket 100 also includes a plurality of dowel openings 114 that are used during assembly and that support the gasket onto one engine component until the second component is assembled.

The gasket 100 includes a second opening 116 and a fourth opening 118. The second opening 116 and the fourth opening 118 are part of a second fluid system, for example, a high pressure cooling system. Each of the second opening 116 and the fourth opening 118 are substantially surrounded by a second sealing bead 120, and a fourth sealing bead 122, respectively. Finally, a fifth opening 124 is formed in the metal substrate 102 of the gasket 100. The fifth opening 124 is surrounded by a fifth sealing bead 126 and be part of a different fluid system, for example, a low pressure cooling system. Other openings may also be formed in the gasket 100 that are used to carry various fluids.

There are some areas of the gasket 100 that border fluid passages that are in close proximity to each other that may contribute to undesirable fluid intermixing should one or more of the sealing beads 108, 110, 120, 122, and/or 126 lose their sealing capability, even if such a loss is only temporary. It is undesirable, for example, to have fluid from the high pressure coolant system leaking into the low pressure oil system, or, fluid from the second opening 116 leaking past the second bead 120 into the first opening 104 through and over a first boundary area 128 of the gasket 100.

The first boundary area 128 is a portion of the metal substrate 102 that lies between the first sealing bead 108 and the second sealing bead 120. Similarly, intermixing of fluids can potentially occur at a second boundary area 130, a second boundary area 132, and/or other similar boundary areas on the gasket 100 that are located between openings carrying different fluids at different pressures in close proximity to each other. These and other issues can advantageously be avoided as described below.

Figure 2:
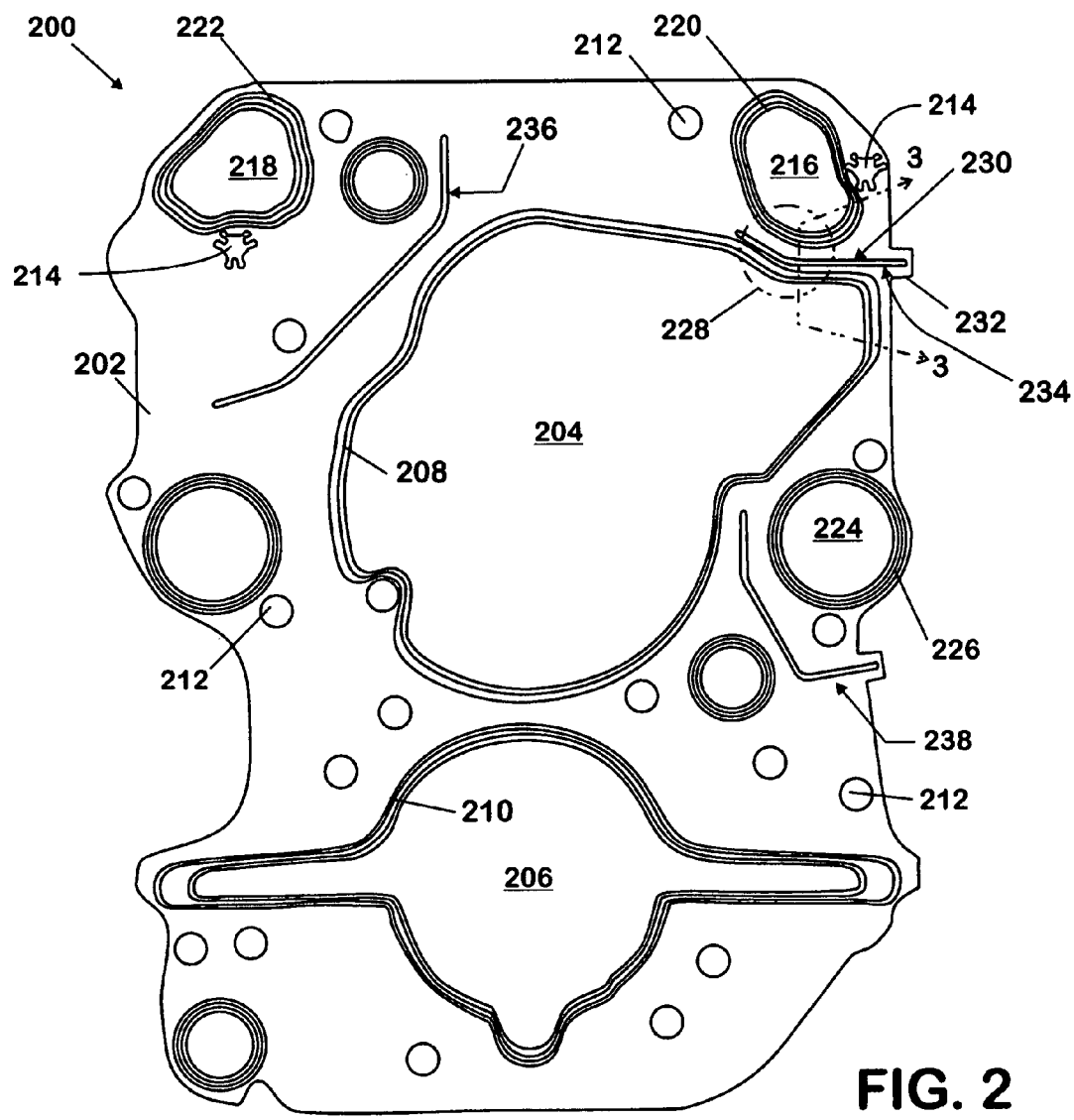
FIG. 2 is a front view of a gasket having sealable fluid openings with leak conduits disposed therebetween in accordance with the invention.

An outline view of one embodiment for an improved gasket 200 is shown in FIG. 2. The gasket 200 includes a metal substrate 202 having openings formed therein. A first opening 204 and a third opening 206 are large and are part of a first fluid system, for example, a low pressure oil system. Each of the first opening 204, and third opening 206, are substantially surrounded by a first sealing bead 208, and a third sealing bead 210, respectively. The first sealing bead 208 and the third sealing bead 210 may be made of an elastomeric material, or any other suitable material that has been deposited or coated onto the metal substrate 202 by an over-molding operation. The sealing beads 208 and 210 are compressed between two adjacent engine components (not shown) when the gasket 200 is installed onto an engine (also not shown), and sealably engage various surfaces formed on the engine components, as described above. The gasket 200 also includes a plurality of fastener openings 212 that are formed in the metal substrate 202 and are arranged to allow for passage of fasteners (not shown) therethrough that are used to connect the engine components to each other. The fastener openings 212 typically do not carry any fluids and do not require sealing, but in the case when sealing was required, additional sealing beads (not shown) may be added around at least some of the fastener openings 212. The gasket 200 may also include a plurality of optional dowel openings 214 that are used during assembly.

In the embodiment shown, the gasket 200 includes a second opening 216 and a fourth opening 218. The second opening 216 and the fourth opening 218 are part of a second fluid system, for example, a high pressure cooling system. Each of the second opening 216 and the fourth opening 218 are substantially surrounded by a second sealing bead 220, and a fourth sealing bead 222, respectively. Finally, a fifth opening 224 is formed in the metal substrate 202 of the gasket 200. The fifth opening 224 is surrounded by a fifth sealing bead 226 and is part of a different fluid system, for example, a low pressure cooling system. Other openings may also be formed in the gasket 200 that are used to carry various fluids.

Some areas of the gasket 200 border different fluid passages that are in close proximity to each other. For example, a first area 228 of the metal substrate 202 at least partially borders the first sealing bead 208 that seals low pressure oil present in the first opening 204, and the second sealing bead 220 that seals high pressure coolant present in the second opening 216. The first area 228 is denoted in FIG. 2 by a dot-dash-dotted circle, and is shown, in a detailed cross-section view, in FIG. 3.

The first area 228 advantageously includes a first leak conduit 230 that is formed as an elongated opening, or channel, in the metal substrate 202. The first leak conduit 230 extends substantially along the entire first area 228 between the first opening 204 and the second opening 216. The first leak passage 230 extends into a protruding tab 232 that is formed in the metal substrate 202. The protruding tab 232 is advantageously arranged to protrude outside of a sealing interface between adjacent components when the gasket 200 is disposed therebetween, and provides an exhaust opening 234 that is defined between the adjacent components and the leak passage 230.

Similarly, a second leak conduit 236 is formed in the metal substrate 202 between the first opening 204 and the fourth opening 218, and a third leak conduit 238 is formed between the first opening 204 and the fifth opening 224. It is advantageous to form more or other leak conduits (not shown) between any two or more sealed openings of the gasket 200 that are used to carry and seal different fluids at different pressures, or, same fluids but at different pressures and/or temperatures.

Each of the leak conduits 230, 236, and 238 advantageously provide a leak path for fluid that might be leaking past a sealing bead. The leak path is open to the environment such that it will route any leaking fluid away from an adjacent sealing bead, allowing it to seep out to the environment, thus avoiding any possibility of fluid intermixing between adjacent sealed openings in the gasket 200 during service.

Figure 3:
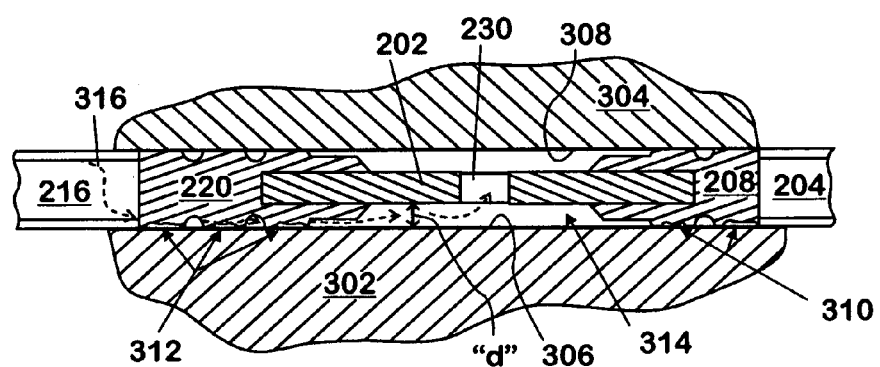
FIG. 3 is a detail cross-section view of a leak conduit in accordance with the invention.

A detail cross-section view of the first area 228, in an as-assembled state between a first component 302 and a second component 304, is shown in FIG. 3. The metal substrate 202 is connected to the first sealing bead 208 that seals the first opening 204 (area toward the right of the bead 208 in the figure), and to the second sealing bead 220 that seals the second opening 216 (area toward the left of the bead 220 in the figure). Each of the first sealing bead 208 and the second bead 220 are compressed between the first component 302 and the second component 304. The first sealing bead 208 and the second bead 220 sealably engage a first interface surface 306, formed on the first component 302, and a second interface surface 308, formed on the second component 304.

The first sealing bead 208 sealably engages each interface surface 306 and 308 along one or more load sites 310. A number of load sites 310 depends on a number of ribs that are formed into and that make up the first sealing bead 208. In the embodiment shown, there are two (2) ribs making up the first sealing bead 208 and, hence, there are two load sites 310 in contact with the first and second interface surfaces 306 and 308. The second bead 220, that seals a higher pressure than the first sealing bead 208, is made up of three (3) ribs, but other sealable engagement configurations may be used. The second bead 220 contacts the first and second interface surfaces 306 and 308 along three load sites 312.

While in the as-assembled position shown in FIG. 3, a cavity 314 may be formed between the metal substrate 202 and the first and/or second interface surfaces 306 and 308. The cavity 314 may border any sealing beads of the gasket 200, and have a variable height that is a distance, d, between the metal substrate 202 and either the first or second components 302 and 304. The distance d is variable, and may be equal to zero, because it is the result of deviations, in the case shown, of the first interface surface 306 from a flat plane and of extent of compression of each of the first sealing bead 208 and the second bead 220 between the first and second components 302 and 304. During operation and over time, the cavity 314 may become partially or completely filled and clogged with debris, such as dirt, salt and water deposits, rust particles, and so forth. In such a situation, pockets of air may form within the cavity 314 that are separated from each other and from the environment.

Also, over time, there might be wear of material at various load sites, in the illustration shown at load sites 310 and/or 312, because of vibration and rubbing of each of the beads 208 and 220 against the first and/or second interface surfaces (306, 308). Wearing of the load sites, for example wearing of the load sites 312 may cause a leak-flow 316, denoted by dotted arrows, of fluid from the second opening 216, through the load sites 312, and into the cavity 314. In a typical gasket, for example the gasket 100 described above, the leak-flow 316 may enter a pocket of the cavity 314, elevate the pressure within that cavity to near a pressure of fluid in the second opening 216, and cause fluid that has accumulated in the cavity 314 to be pushed through the seal load sites 310 and into the first opening 204, effectively intermixing it with whatever fluid is present therein. Advantageously, this scenario is avoided with the addition of the leak conduit 230 in the metal substrate 202.

The leak conduit 230 acts as a drain for the leak-flow 316 after it enters the cavity 314. The leak-flow 316 that passes through the load sites 312 and enters the cavity 314, safely exits the cavity 314 through the leak conduit 230. Thus, pressurization of a pocket of air within the cavity 314 can be avoided, and the leak-flow 316 becomes externally visible to indicate the need for service or replacement of the gasket 200.

Figure 4:
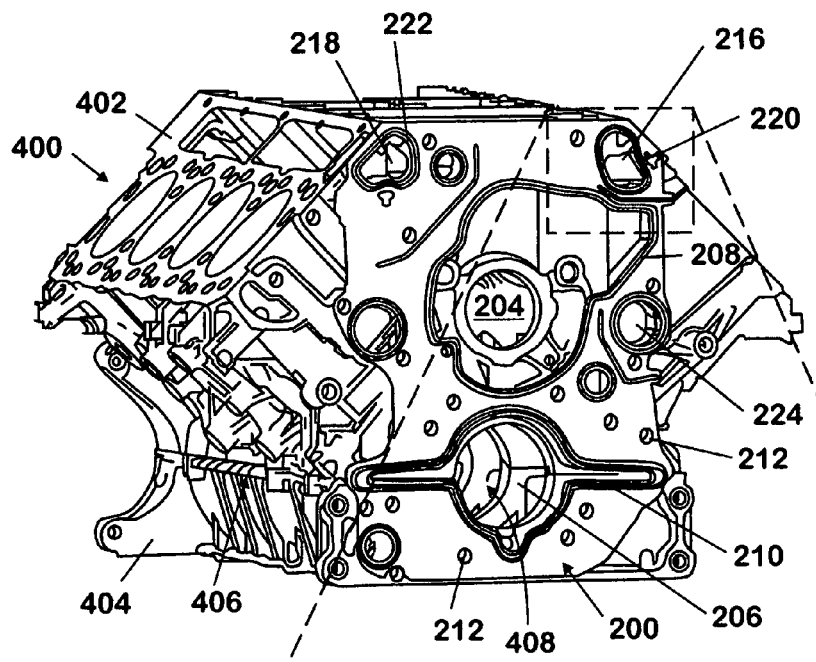
FIG. 4 is an outline view of a partially assembled internal combustion engine having a gasket assembled thereon in accordance with the invention.
Figure 5:
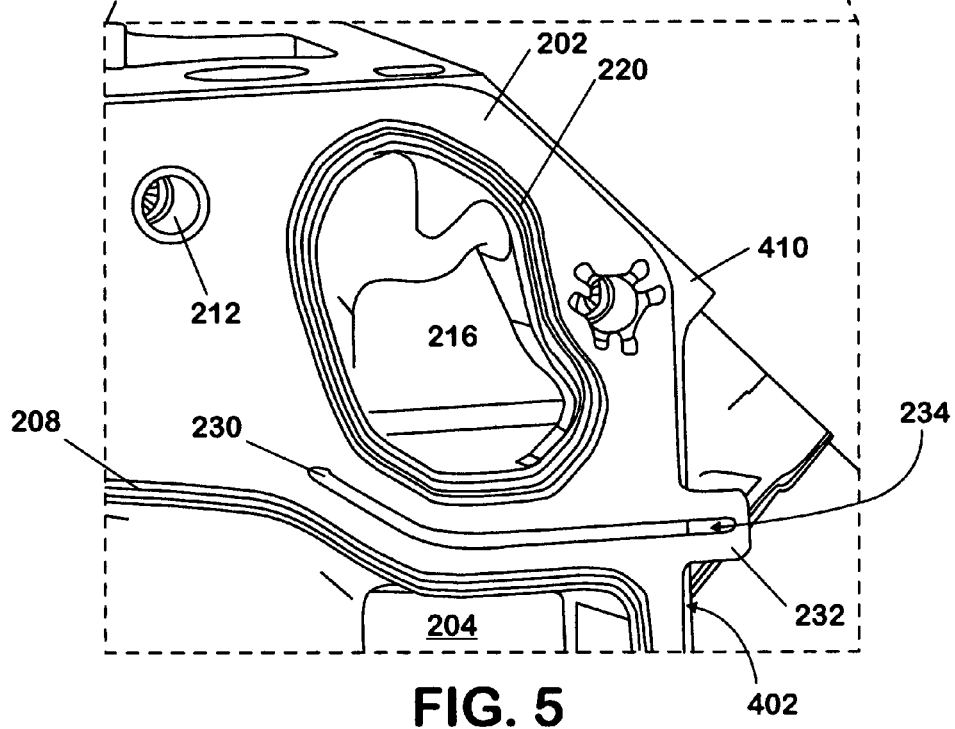
FIG. 5 is a detail outline view of a leak conduit as assembled onto an engine in accordance with the invention.

An outline view of a partially assembled engine 400 having the gasket 200 assembled thereon is shown in FIG. 4, and a detail expanded view of the region surrounding the second opening 216 of the gasket 200 is shown in FIG. 5. The engine 400 as shown includes an upper crankcase 402 that is connected to a lower crankcase 404 along an interface 406. A bore 408 is formed between features of the upper crankcase 402 and the lower crankcase 404 that is arranged to receive a crankshaft (not shown) therein that passes through the third opening 206 in the gasket 200.

The crankshaft is surrounded by low pressure oil during operation of the engine 400. The upper crankcase 402 has features enabling connection to an oil pump (not shown) through the first opening 204. The oil pump is also surrounded by low pressure oil during operation of the engine 400. The engine 400 also has high pressure coolant supply passages integrated therewith in the upper crankcase 402 that are sealed along a front face 410 of the upper crankcase 402 by the second bead 220 surrounding the second opening 216, and by the fourth bead 222 surrounding the fourth opening 218. A flow of coolant from a water pump (not shown) that is integrated with a front module (not shown) that is connected to the engine through the gasket 200 is pushed though the second and fourth openings 216 and 218 into the upper crankcase 402.

The leak conduit 230 is in fluid communication with the exhaust opening 234 which is defined between two surfaces of the metal substrate 202 that define the conduit 230, the front face 410 of the upper crankcase 402, and a corresponding face of the front module (not shown). Other leak conduits that are formed onto the gasket 200, for example the conduits 236 and 238 (shown in FIG. 2) may or may not have corresponding protruding tabs to define corresponding openings because there may be other openings, for example, depressed features on the front face 410 that intersect a leak conduit.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A gasket comprising:
   a metal substrate having a first opening and a second opening formed therein;
   a first sealing bead that substantially surrounds the first opening;
   a second sealing bead that substantially surrounds the second opening;
   a leak conduit comprising an elongate through-opening in the metal substrate in an area that is disposed between the first sealing bead and the second sealing bead, such that a leak-flow of a fluid from the second opening past the second sealing bead is routed away from the first sealing bead.

2. The gasket of claim 1, wherein the first sealing bead is arranged and constructed to seal a first fluid, and wherein the second sealing bead is arranged and constructed to seal a second fluid.

3. The gasket of claim 1, wherein the metal substrate further includes a plurality of fastener openings formed therein.

4. A gasket comprising:
   a metal substrate having a first opening and a second opening formed therein;
   a first sealing bead that substantially surrounds the first opening;
   a second sealing bead that substantially surrounds the second opening;
   a leak conduit formed in the metal substrate in an area that is disposed between the first sealing bead and the second sealing bead, such that a leak-flow of a fluid from the second opening past the second sealing bead is routed away from the first sealing bead, wherein the metal substrate includes a protruding tab, wherein the leak conduit extends into the protruding tab, wherein the protruding tab is arranged to protrude outside of a sealing interface between adjacent components when the gasket is disposed therebetween.

5. The gasket of claim 4, wherein the leak conduit comprises an elongated through-opening in the metal substrate.

6. The gasket of claim 1, further comprising an additional leak conduit that is formed in the metal substrate.

7. The gasket of claim 1, wherein the leak conduit provides a leak path to the environment for a leak-flow of fluid leaking past at least one of the first sealing bead and the second sealing bead when the gasket is disposed between at least two components.

8. An internal combustion engine comprising:
   a first engine component having at least a first fluid passage and a second fluid passage formed therein, wherein the first fluid passage contains a first fluid at a first pressure, and wherein the second fluid passage contains a second fluid at a second pressure, during operation of the engine;
   a second engine component having a corresponding first fluid passage and a corresponding second fluid passage formed therein;
   a gasket disposed between the first engine component and the second engine component, wherein the gasket includes:
   a metal substrate,
   a first opening formed in the metal substrate that fluidly connects the first fluid passage with the corresponding first fluid passage, wherein the first opening is bounded by a first sealing bead that is connected to the metal substrate,
   a second opening formed in the metal substrate that fluidly connects the first fluid passage with the corresponding second fluid passage, wherein the second opening is bounded by a second sealing bead that is connected to the metal substrate, wherein the first sealing bead, and the second sealing bead, sealably engage the first engine component, and the second engine component;

a leak conduit that fluidly connects a cavity that is formed between the gasket and at least one of the first engine component and the second engine component with an exhaust opening.

9. The internal combustion engine of claim 8, wherein the first fluid passage contains a first fluid at a first pressure, wherein the second fluid passage contains a second fluid at a second pressure, and wherein the first pressure is lower than the second pressure.

10. The internal combustion engine of claim 8, wherein the metal substrate further includes a plurality of fastener openings formed therein, wherein a plurality of fasteners connects the first engine component with the second engine component, and wherein each of the plurality of fasteners pass through at least one of the plurality of fastener openings in the metal substrate.

11. The internal combustion engine of claim 8, wherein the leak conduit is an elongated opening in the metal substrate, and wherein the leak conduit provides an exhaust opening to the environment such that any fluid present therein seeps out of the internal combustion engine.

12. The internal combustion engine of claim 8, wherein the metal substrate includes a protruding tab, wherein the leak conduit extends into the protruding tab, wherein the protruding tab is arranged to protrude outside of a sealing interface between the first engine component and the second engine component when the gasket is disposed therebetween.

13. The internal combustion engine of claim 8, further comprising an additional leak conduit that is formed in the metal substrate.

14. The internal combustion engine of claim 8, wherein the leak conduit provides a leak path to the environment for a leak-flow of fluid leaking past at least one of the first sealing bead and the second sealing bead when the gasket is disposed between the first engine component and the second engine component.

15. A sealing arrangement for preventing intermixing between a first fluid passage and a second fluid passage, the first fluid passage and the second fluid passage formed in connectable components of an internal combustion engine, the sealing arrangement comprising:

a first engine component having a portion of the first fluid passage and a portion of the second fluid passage formed therein, wherein the first component has a first interface surface having a first opening in fluid communication with the portion of the first fluid passage and a second opening in fluid communication with the portion of the second fluid passage;

a second engine component having an additional portion of the first fluid passage and an additional portion of the second fluid passage formed therein, wherein the second component has second interface surface having a corresponding first opening in fluid communication with the additional portion of the first fluid passage and a corresponding second opening in fluid communication with the additional portion of the second fluid passage, wherein the second interface surface mates with the first interface surface when the first component is connected with the second component, such that the portion of the first fluid passage fluidly communicates with the additional portion of the first fluid passage and the portion of the second fluid passage fluidly communicates with the additional portion of the second fluid passage;

a gasket disposed between the first interface surface and the second interface surface when the first component is connected with the second component, the gasket having a first sealable opening formed in a metal substrate of the gasket that aligns with the first opening and the corresponding first opening, wherein the first sealable opening is surrounded by a first sealing bead that sealably engages the first interface surface and the second interface surface, and a second sealable opening formed in the metal substrate of the gasket that aligns with the second opening and the corresponding second opening, wherein the second sealable opening is surrounded by a second sealing bead that sealably engages the first interface surface and the second interface surface;

wherein a leak conduit is formed in the metal substrate of the gasket in an area that is disposed between the first sealing bead and the second sealing bead, such that the leak conduit is arranged to allow fluids therein to seep out to the environment.

16. The sealing arrangement of claim 15, wherein the first sealing bead is arranged and constructed to seal a first fluid, and wherein the second sealing bead is arranged and constructed to seal a second fluid.

17. The sealing arrangement of claim 15, wherein the metal substrate further includes a plurality of fastener openings formed therein.

18. The sealing arrangement of claim 15, wherein the leak conduit is an elongated opening in the metal substrate.

19. The sealing arrangement of claim 15, wherein the metal substrate includes a protruding tab, wherein the leak conduit extends into the protruding tab, wherein the protruding tab is arranged to protrude outside of a sealing interface between adjacent components when the gasket is disposed therebetween.

20. The sealing arrangement of claim 15, wherein the leak conduit provides a leak path to the environment for a leak-flow of fluid leaking past at least one of the first sealing bead and the second sealing bead when the gasket is disposed between at least two components.

* * * * *